(12) United States Patent
Song et al.

(10) Patent No.: US 12,219,234 B2
(45) Date of Patent: Feb. 4, 2025

(54) WEARABLE ELECTRONIC DEVICE INCLUDING SMALL CAMERA

(71) Applicant: Samsung Electronics Co., Ltd., Suwon-si (KR)

(72) Inventors: Doukyoung Song, Suwon-si (KR); Hokeun Kwak, Suwon-si (KR); Jaeheung Park, Suwon-si (KR); Hyoungil Song, Suwon-si (KR); Jina Jeon, Suwon-si (KR); Yonghyun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 198 days.

(21) Appl. No.: 17/569,883

(22) Filed: Jan. 6, 2022

(65) Prior Publication Data

US 2022/0229298 A1   Jul. 21, 2022

Related U.S. Application Data

(63) Continuation of application No. PCT/KR2021/020343, filed on Dec. 31, 2021.

(30) Foreign Application Priority Data

Jan. 18, 2021   (KR) .................. 10-2021-0007054

(51) Int. Cl.
*H04N 23/57*   (2023.01)
*G02B 7/02*   (2021.01)
(Continued)

(52) U.S. Cl.
CPC ............. *H04N 23/57* (2023.01); *G02B 7/021* (2013.01); *G02B 27/0093* (2013.01);
(Continued)

(58) Field of Classification Search
None
See application file for complete search history.

(56) References Cited

U.S. PATENT DOCUMENTS

| | | |
|---|---|---|
| 7,361,880 B2 | 4/2008 | Webster |
| 9,455,358 B2 | 9/2016 | Nakayama |
| | (Continued) | |

FOREIGN PATENT DOCUMENTS

| | | |
|---|---|---|
| CN | 109106334 A | 1/2019 |
| JP | 2014-000314 A | 1/2014 |
| | (Continued) | |

OTHER PUBLICATIONS

International Search Report dated Apr. 8, 2022, issued in International Application No. PCT/KR2021/020343.
(Continued)

*Primary Examiner* — Paul M Berardesca
(74) *Attorney, Agent, or Firm* — Jefferson IP Law, LLP

(57) ABSTRACT

An electronic device is provided. The electronic device includes a frame including a first region and a second region, a window member supported by the frame, a support member rotatably connected to the frame, a display module configured to project an image onto the window member, and a camera disposed in the second region of the frame to capture an eye part of a user. The camera may include a substrate and an image sensor disposed on the substrate, and an area of the substrate may be equal to or smaller than an area of the image sensor.

10 Claims, 10 Drawing Sheets

(51) Int. Cl.
  *G02B 27/00* (2006.01)
  *G02B 27/01* (2006.01)
  *H04N 23/54* (2023.01)
  *H04N 23/55* (2023.01)
(52) U.S. Cl.
  CPC ..... *G02B 27/0172* (2013.01); *G02B 27/0176*
      (2013.01); *G02B 27/0179* (2013.01); *H04N*
       *23/54* (2023.01); *H04N 23/55* (2023.01);
      *G02B 2027/0138* (2013.01); *G02B 2027/0178*
         (2013.01); *G02B 2027/0187* (2013.01)

(56) References Cited

U.S. PATENT DOCUMENTS

| | | | |
|---|---|---|---|
| 2009/0135296 A1* | 5/2009 | Wu | H01L 27/14618 348/373 |
| 2011/0194019 A1* | 8/2011 | Shyu | G02B 13/0025 348/360 |
| 2013/0188030 A1* | 7/2013 | Igarashi | H01L 27/14625 348/373 |
| 2013/0188080 A1 | 7/2013 | Olsson et al. | |
| 2013/0258089 A1* | 10/2013 | Lyons | H04N 23/69 348/77 |
| 2014/0055746 A1* | 2/2014 | Nistico | A61B 3/107 351/206 |
| 2014/0211320 A1* | 7/2014 | Hori | G02B 27/017 359/630 |
| 2014/0253799 A1* | 9/2014 | Moon | H04M 1/0264 348/376 |
| 2015/0009309 A1 | 1/2015 | Heinrich et al. | |
| 2015/0193920 A1* | 7/2015 | Knee | H04N 23/76 382/154 |
| 2015/0373239 A1 | 12/2015 | Choi | |
| 2016/0206196 A1 | 7/2016 | Pfleger et al. | |
| 2016/0291348 A1* | 10/2016 | Chen | G02C 11/10 |
| 2017/0315274 A1 | 11/2017 | Park et al. | |
| 2018/0227470 A1* | 8/2018 | Rönngren | H04N 5/2628 |
| 2018/0267271 A1* | 9/2018 | Tseng | H04M 1/0264 |
| 2020/0379263 A1* | 12/2020 | Fan | A61B 3/113 |
| 2021/0063754 A1 | 3/2021 | Lee et al. | |
| 2021/0250509 A1* | 8/2021 | Kim | H04N 23/51 |
| 2021/0258411 A1* | 8/2021 | Yang | H04M 1/0264 |
| 2021/0314468 A1* | 10/2021 | Liang | H04N 23/55 |
| 2021/0333823 A1* | 10/2021 | Maric | G02B 27/0176 |
| 2022/0206573 A1 | 6/2022 | Dierkes et al. | |
| 2022/0232148 A1* | 7/2022 | Song | G03B 17/12 |
| 2022/0317549 A1* | 10/2022 | Yin | H04N 23/54 |
| 2023/0005759 A1* | 1/2023 | Watanabe | H01L 24/73 |
| 2023/0017395 A1* | 1/2023 | Yang | H04N 23/66 |
| 2023/0074379 A1* | 3/2023 | Chiang | G02B 13/02 |
| 2023/0093501 A1* | 3/2023 | Sekido | H05K 1/02 348/65 |
| 2023/0130907 A1* | 4/2023 | Berger | G02B 27/0101 345/8 |
| 2024/0056671 A1* | 2/2024 | Voigt | G02B 27/0093 |

FOREIGN PATENT DOCUMENTS

| | | |
|---|---|---|
| KR | 10-2010-0009341 A | 1/2010 |
| KR | 10-2016-0000328 A | 1/2016 |
| KR | 10-2017-0126171 A | 11/2017 |
| KR | 10-1908102 B1 | 10/2018 |
| KR | 10-2019-0106900 A | 9/2019 |
| KR | 10-2020-0098908 A | 8/2020 |
| KR | 10-2022-0056197 A | 5/2022 |
| WO | 2020/244752 A1 | 12/2020 |
| WO | WO-2022154623 A1 * | 7/2022 ........... H04N 5/2252 |
| WO | WO-2022177334 A1 * | 8/2022 ......... G02B 27/0101 |

OTHER PUBLICATIONS

European Search Report dated Mar. 28, 2024, issued in European Application No. 21919960.1.

* cited by examiner

WEARABLE ELECTRONIC DEVICE INCLUDING SMALL CAMERA

CROSS-REFERENCE TO RELATED APPLICATION(S)

This application is a continuation application, claiming priority under § 365 (c), of an International application No. PCT/KR2021/020343, filed on Dec. 31, 2021, which is based on and claims the benefit of a Korean patent application number 10-2021-0007054, filed on Jan. 18, 2021, in the Korean Intellectual Property Office, the disclosure of which is incorporated by reference herein in its entirety.

TECHNICAL FIELD

The disclosure relates to a wearable electronic device including a small camera configured to capture images of the user's eyes.

BACKGROUND ART

Augmented reality (AR) may refer to a technology for expressing elements which are generated through computer graphic processing, and which are added to the actual reality recognized by users. For example, the AR technology may be used to display an object existing in the reality together with an additional virtual object including information related to the object.

The AR may be implemented through various devices. The AR may be typically implemented through wearable electronic devices such as an eyeglass-type electronic device and a head mounted display (HMD).

In order to implemented AR by an eyeglass-type electronic device among the same, images may be displayed on the eyeglass lenses. Light may be projected onto the eyeglass lenses to display images on the lenses. For example, a projector having a very small size (for example, micro projector or pico projector) may be used. Examples of such projectors may include a laser scanning display (LSD), a digital micro-mirror display (DMD), and a liquid crystal on silicon (LCoS). In addition, a transparent display may be used to display images on lenses.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

In order to implement AR, an electronic device may include multiple cameras. For example, cameras for capturing images of both eyes may be provided to track movement of the user's pupils, respectively.

The volume and weight of the electronic device may increase in proportion to the size of cameras included in the electronic device, thereby making it uncomfortable to wear the same. There may also a problem in that, if cameras for capturing images of the user's eyes have large sizes, the cameras may appear in the user's field of view.

Aspects of the disclosure are to address at least the above-mentioned problems and/or disadvantages and to provide at least the advantages described below. Accordingly, an aspect of the disclosure is to provide a wearable electronic device including a small camera capable of capturing images of the user's eyes without appearing in the user's field of view.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a frame including a first region and a second region, a window member supported by the frame, a support member rotatably connected to the frame, a display module configured to project an image onto the window member, and a camera disposed in the second region of the frame to capture a portion of a user's eye, wherein the camera includes a substrate and an image sensor disposed on the substrate, and wherein an area of the substrate is equal to or smaller than an area of the image sensor.

In accordance with another aspect of the disclosure, a camera included in a head mounted electronic device is provided. The camera includes a substrate, an image sensor disposed on the substrate and electrically connected to the substrate, a protection glass disposed on the image sensor, a lens barrel disposed on the protection glass and having a plurality of lenses embedded therein, and a cover glass coupled to the lens barrel to protect the plurality of lenses included in the lens barrel, wherein an area of the substrate is less than or equal to an area of the image sensor.

Advantageous Effects of Invention

According to various embodiments disclosed herein, cameras may be made small such that the electronic device can become lightweight, and inclusion of the cameras in the user's field of view can be reduced, thereby improving usability of the electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

BEST MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular form "a," "an," and "the" include plural referents unless the context clearly dictates otherwise. Thus, for example, reference to "a component surface" includes reference to one or more of such surfaces.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

Figure 1:
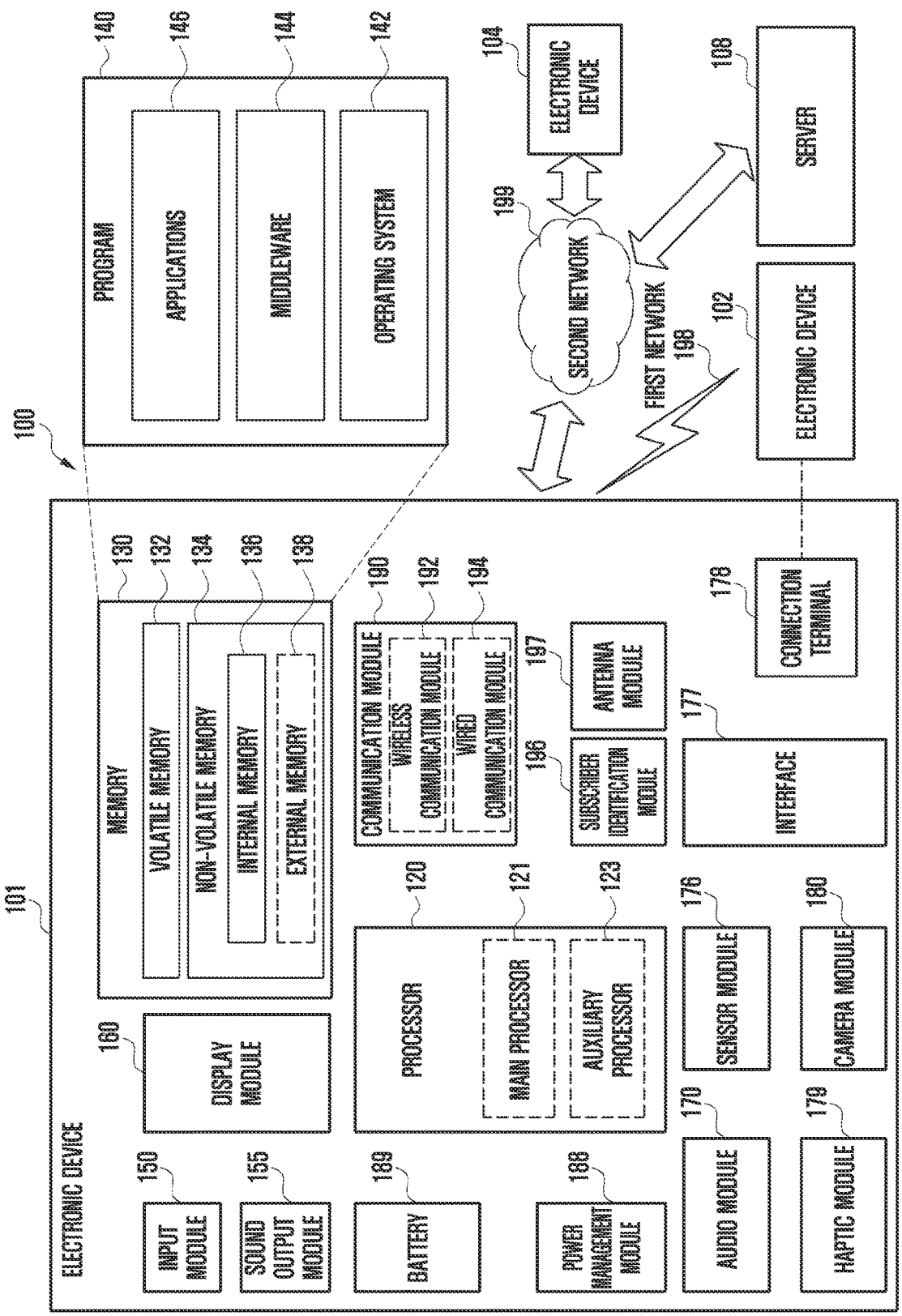
FIG. 1 is a block diagram of an electronic device in a network environment, according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include internal memory 136 and external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mm Wave antenna module. According to an embodiment, the mm Wave antenna module may include a printed circuit board, a RFIC disposed on a first surface (e.g., the bottom surface) of the printed circuit board, or adjacent to the first surface and capable of supporting a designated high-frequency band (e.g., the mm Wave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
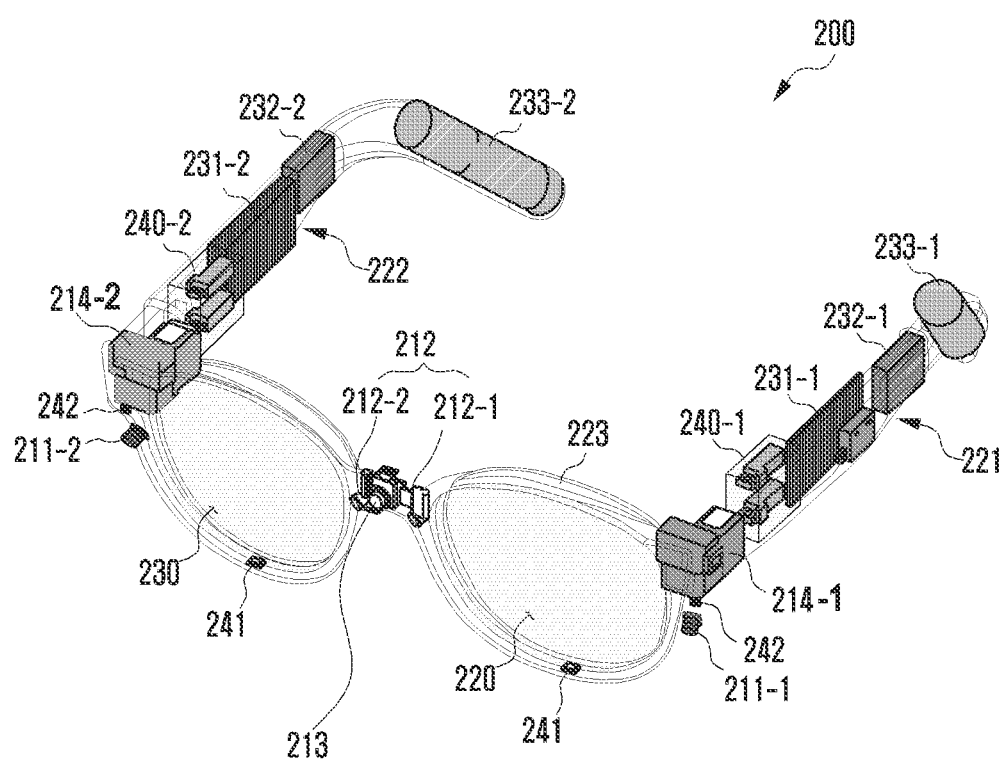
FIG. 2 is an overall configuration diagram of an electronic device including a plurality of cameras according to an embodiment of the disclosure.

FIG. 2 is an overall configuration diagram of an electronic device (e.g., the electronic device 101 in FIG. 1) including a plurality of cameras according to an embodiment of the disclosure.

Referring to FIG. 2, the electronic device 200 may be an electronic device 200 manufactured to be worn on a user's head part. For example, the electronic device 200 may be configured in the form of at least one of glasses, goggles, a helmet, or a hat, but is not limited thereto. According to an embodiment of the disclosure, the electronic device 200 may include a plurality of glass (e.g., the first glass 220 and/or the second glass 230) corresponding to both eyes (e.g., left eye and/or right eye) of a user, respectively.

The electronic device 200 may provide an image related to an augmented reality (AR) service to a user. The electronic device 200 may project or display a virtual object on first glass 220 and/or second glass 230 so that the user can see use at least one virtual object superimposed on reality perceived through the first glass 220 and/or the second glass 230 of the electronic device.

Referring to FIG. 2, the electronic device 200 may include a body part, a support part (e.g., the first support part 221 or the second support part 222), and a hinge part (e.g., the second hinge part 240-1 or the second hinge part 240-2).

The body part and the support part 221 or 222 may be operatively connected through the hinge part 240-1 or 240-2. The body part may include a portion formed to be at least partially mounted on the user's nose.

The support part 221 or 222 may include a support member having a shape that can be mounted on the user's ear. The support part 221 or 222 may include a first support part 221 mounted on the left ear and/or a second support part 222 mounted on the right ear.

The first hinge part 240-1 may connect the body part 223 to the first support part 221 such that the first support part 221 is rotatable with respect to the body part 223. The second hinge part 240-2 may connect the body part 223 to the second support part 222 such that the second support part 222 is rotatable with respect to the body part 223. According to another embodiment of the disclosure, the hinge parts 240-1 and 240-2 of the electronic device 200 may be omitted. For example, the support parts 221 and 222 may be directly connected to the body part 223.

The body part 223 may include at least one glass (e.g., the first glass 220 or the second glass 230), at least one display module 214, at least one camera module (e.g., the front capturing camera module 213), an eye tracking camera module 212 (e.g., the first eye tracking camera module 212-1 or the second eye tracking camera module 212-2), a gesture camera module (e.g., the first gesture camera module 211-1 or the second gesture camera module 211-2), and at least one microphone 241.

In the case of the electronic device 200 illustrated in FIG. 2, light generated by the display module 214-1 or 214-2 may be projected onto the glass 220 or 230 to display information thereon. For example, light generated by the first display module 214-1 may be projected onto the first glass 220, and light generated by the second display module 214-2 may be projected onto the second glass 230. Light capable of displaying a virtual object may be projected onto the glass 220 and 230 at least partially formed of a transparent material, and thus a user can recognize a reality in which the virtual object is superimposed. In this case, it may be understood that the display module 160 illustrated in FIG. 1 may include at least one of the display module 214 and the glass 220 or 230 of the electronic device 200 illustrated in FIG. 2. However, the electronic device described in the disclosure is not limited to displaying information through the method described above. A display module that may be included in the electronic device may be changed to a display module including various types of information display methods. For example, when a display panel including a light emitting element made of a transparent material is embedded in the glass 220 or 230, information can be displayed without a separate display module (e.g., the first display module 214-1 or the second display module 214-2). In this case, the display module 160 illustrated in FIG. 1 may refer to the glass 220 or 230 and a display panel included in the glass.

The virtual object output through the display module 214 may include information related to an application program executed in the electronic device 200 and/or information related to an external object existing in a real space recognized by a user through the glass 220 or 230. The external object may include an object existing in the real space. Hereinafter, the real space recognized by the user through the glass 220 or 230 will be referred to as a region of a user's field of view (FoV). For example, the electronic device 200 may identify an external object included in at least a part of a region determined as a user's field of view (FoV) in image information related to the real space obtained through a camera module (e.g., the capturing camera module 213) of the electronic device 200. The electronic device 200 may output a virtual object related to the identified external object through the display module 214.

The electronic device 200 may display a virtual object related to an augmented reality service together, based on image information related to a real space acquired through the capturing camera module 213 of the electronic device 200. The electronic device 200 may display a virtual object, based on display modules (e.g., a first display module 214-1 corresponding to the left eye, and/or a second display module 214-2 corresponding to the right eye) disposed to correspond to both eyes of a user. The electronic device 200 may display the virtual object, based on preconfigured setting information (e.g., resolution, frame rate, brightness, and/or display region).

The glass 220 or 230 may include a light collecting lens (not shown) and/or a waveguide (e.g., the first waveguide and/or the second waveguide). For example, the first waveguide may be partially located on the first glass 220, and the second waveguide may be partially located on the second glass 230. Light emitted from the display module 214 may be incident onto one surface of the glass 220 or 230. The light incident onto one surface of the glass 220 or 230 may be transmitted to a user through the respective first and second waveguides located in the glass 220 or 230. The waveguide may be made of glass, plastic, or polymer, and may include a nanopattern formed on one internal or external surface thereof. For example, the nanopattern may include a polygonal or curved grating structure. According to one embodiment, light incident onto one surface of the glass 220 or 230 may be propagated or reflected inside the waveguide by the nanopattern to be transmitted to a user. The waveguide may include at least one of at least one diffractive element (e.g., diffractive optical element (DOE), holographic optical element (HOE)) or a reflective element (e.g., reflective mirror). According to one embodiment, the waveguide may guide the light emitted from the display module 214 to the user's eye by using at least one diffractive element or a reflective element.

The electronic device 200 may include a capturing camera module 213 (e.g., red, green, and blue (RGB) camera module) for capturing an image corresponding to a user's field of view (FoV) and/or for measuring a distance to an object, an eye tracking camera module 212-1 or 212-2 for identifying a user's gaze direction, and/or a gesture camera module 211-1 or 211-2 for recognizing a certain space. For example, the capturing camera module 213 may capture an image in the front direction of the electronic device 200, and the eye tracking camera module 212-1 or 212-2 may capture an image in a direction opposite to the capture direction of the capturing camera module 213. For example, the first eye tracking camera module 212-1 may partially capture the user's left eye, and the second eye tracking camera module 212-2 may partially capture the user's right eye. The capturing camera module 213 may include a high-resolution camera module such as a high resolution (HR) camera module and/or a photo video (PV) camera module. The eye tracking camera modules 212-1 or 212-2 may detect the user's pupil and track a gaze direction. The tracked gaze direction may be used to move the center of a virtual image including a virtual object in response to the gaze direction. The gesture camera module 211-1 or 211-2 may detect a user gesture within a predetermined distance (e.g., predetermined space) and/or a predetermined space. The gesture camera module 211-1 or 211-2 may include a camera module including a global shutter (GS). For example, the gesture camera module 211-1 or 211-2 may be a camera module including GS for reducing a rolling shutter (RS) phenomenon so as to detect and track quick hand movements and/or minute movements by a finger or the like.

The electronic device 200 may sense an eye corresponding to a fixating eye and/or an auxiliary eye from among the left eye and/or the right eye by using at least one camera module 211-1, 211-2, 212-1, 212-2, and/or 213. For example, the electronic device 200 may sense an eye corresponding to a fixating eye and/or an auxiliary eye, based on a user's gaze direction with respect to an external object or a virtual object.

The number and position of at least one camera module (e.g., the capturing camera module 213, the eye tracking camera module 212-1 or 212-2, and/or the gesture camera module 211-1 or 211-2) included in the electronic device 200 illustrated in FIG. 2 may not be limited. For example, the number and position of at least one camera module (e.g., the capturing camera module 213, the eye tracking camera module 212-1 or 212-2, and/or the gesture camera module 211-1 or 211-2) may vary based on a shape (e.g., shape or size) of the electronic device 200.

The electronic device 200 may include at least one illumination LED 242 (e.g., a first illumination LED and a second illumination LED) to increase accuracy of the at least one camera module (e.g., the capturing camera module 213, the eye tracking camera module 212-1 or 212-2, and/or the gesture camera module 211-1 or 211-2). For example, the first illumination LED may be disposed on a portion corresponding to the user's left eye, and the second illumination LED may be disposed on a portion corresponding to the user's right eye. The illumination LED 242-1 or 242-2 may be used as auxiliary means for increasing accuracy when the user's pupil is captured using the eye tracking camera module 212-1 or 212-2 and may include an IR LED for generating light having infrared wavelength. In addition, the illumination LED 242 may be used as auxiliary means when a subject to be captured is not easily detected due to the dark environment or mixing and reflection by light from various light sources in a case where a user's gesture is captured using the gesture camera module 211-1 or 211-2.

The electronic device 101 may include a microphone 241 (e.g., a first microphone or a second microphone) for receiving a user's voice and ambient sounds. For example, the microphone 241 may be a component included in the audio module 170 in FIG. 1.

The first support 221 and/or the second support 222 may include a printed circuit board (PCB) (e.g., the first printed circuit board 231-1 or the second printed circuit board 231-2), a speaker (e.g., the first speaker 232-1 or the second speaker 232-2), and/or a battery (e.g., the first battery 233-1 or the second battery 233-2).

According to various embodiments, the speaker 232-1 or 232-2 may include a first speaker 232-1 for transmitting an audio signal to the user's left ear and a second speaker 232-2 for transmitting an audio signal to the user's right ear. The speaker 232-1 or 232-2 may be a component included in the audio module 170 in FIG. 1.

The electronic device 200 may be provided with a plurality of batteries 233-1 and 233-2 and may supply power to the printed circuit boards 231-1 and 231-2 through a power management module (e.g., the power management module 188 in FIG. 1). For example, the plurality of batteries 233-1 and 233-2 may be electrically connected to a power management module (e.g., the power management module 188 in FIG. 1).

Although it has been described above that the electronic device 200 is a device that displays augmented reality, the electronic device 200 may be a device that displays virtual reality (VR). In this case, the glass 220 or 230 may be formed of an opaque material so that a user cannot recognize the real space through the glass 220 or 230. In addition, the glass 230 may function as the display module 160. For example, the glass 220 or 230 may include a display panel for displaying information.

Figure 3A:
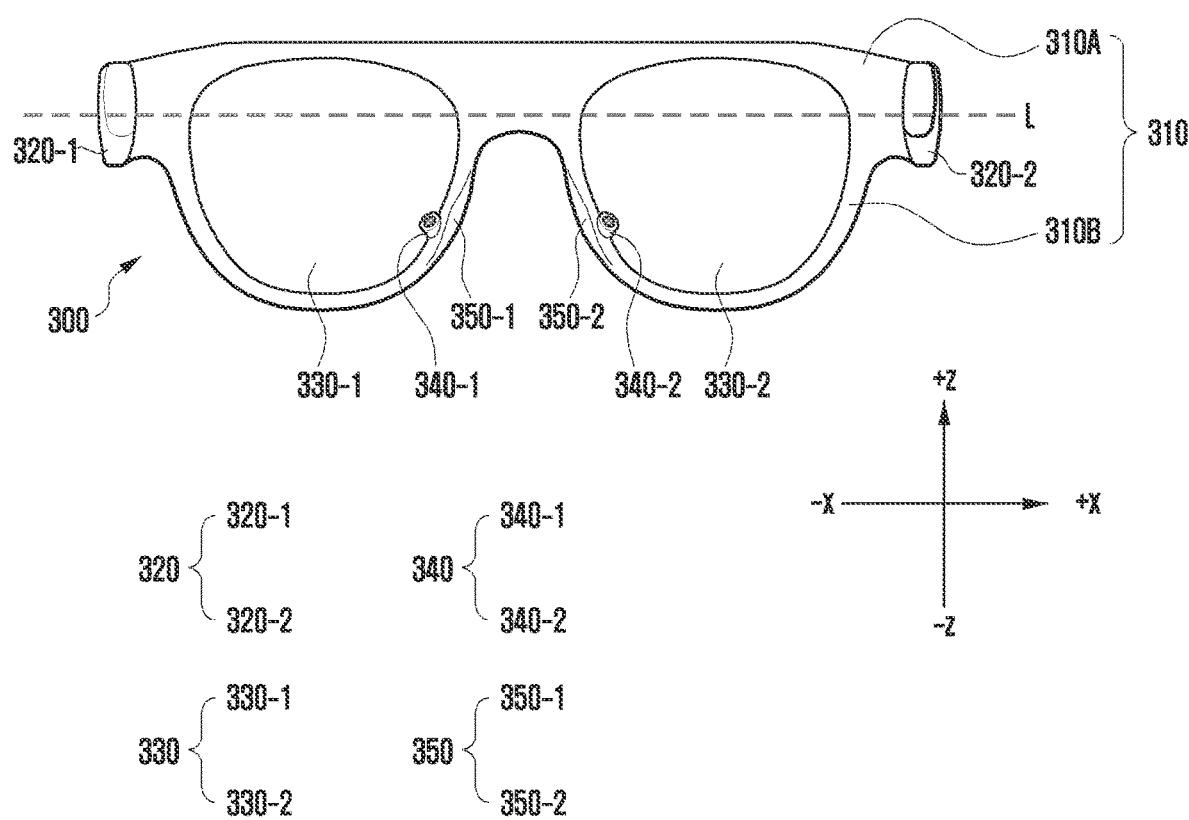
FIG. 3A illustrates an electronic device according to an embodiment of the disclosure.
Figure 3B:
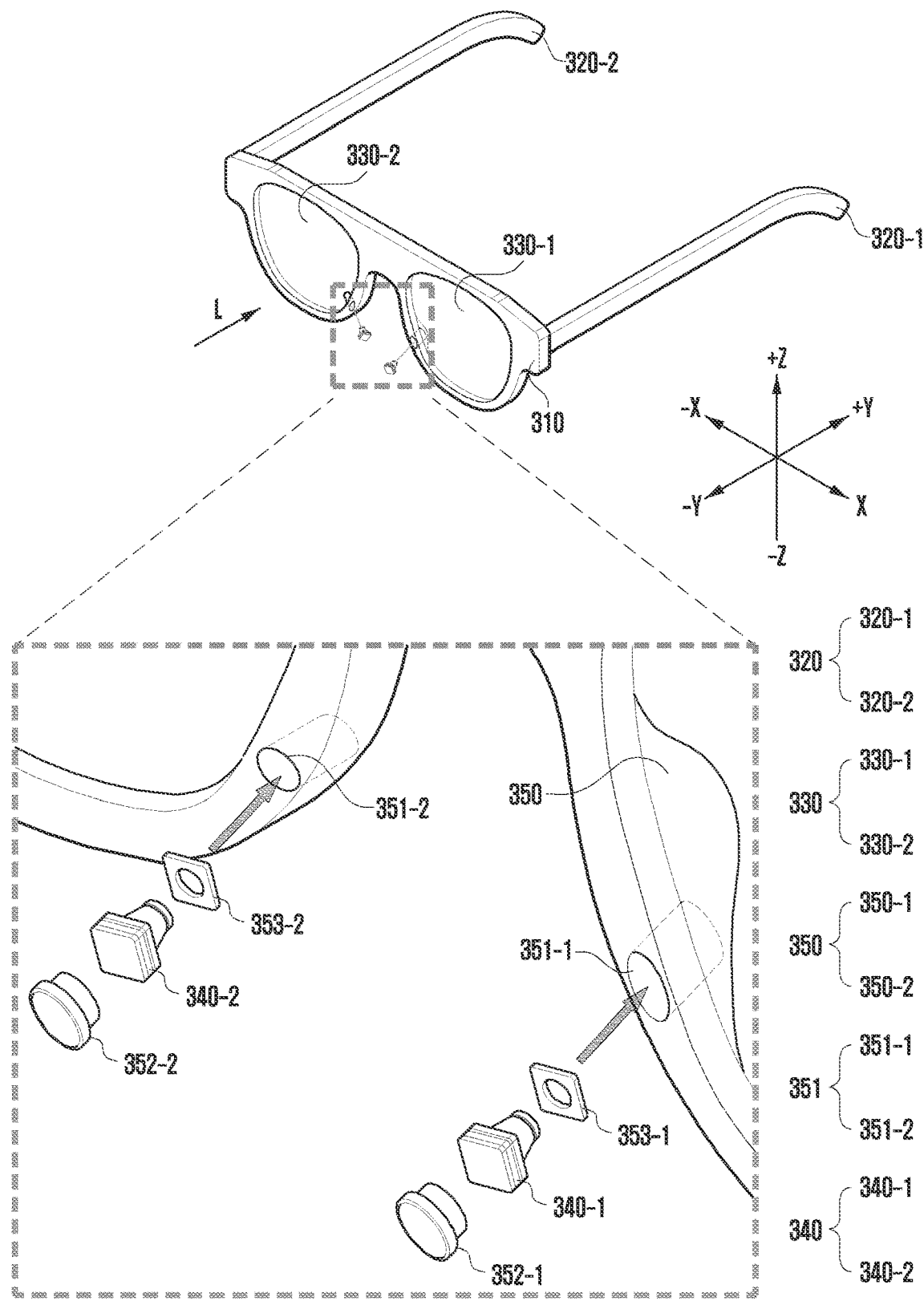
FIG. 3B is an exploded perspective view of an electronic device and a camera according to an embodiment of the disclosure.

FIG. 3A illustrates an electronic device according to an embodiment of the disclosure. FIG. 3B is an exploded perspective view of an electronic device and a camera according to an embodiment of the disclosure.

Referring to FIGS. 3A and 3B, the electronic device 300 may include a frame 310 (e.g., the body part 223 in FIG. 2), a window member 330 (e.g., the first glass 220 or the second glass 230 in FIG. 2), a support member 320 (e.g., the first support part 221 or the second support part 222 of FIG. 2), a display module (not shown) (e.g., the display module 160 in FIG. 1), a camera 340 (e.g., the eye tracking camera 212 in FIG. 2), an illumination part (not shown) (e.g., the illumination LED 242 in FIG. 2), and a processor (not shown) (e.g., the processor 120 in FIG. 1). The window member 330, the support member 320, the display module, the camera 340, and the illumination part may be provided as pair, respectively, to correspond to the user's left and right eye. For example, the window member 330 may include a first window member 330-1 and a second window member 330-2, the support member 320 may include the first support member 320-1 and a second support member 320-2, and the camera 340 may include a first camera 340-1 and a second camera 340-2. In some cases, specific components among the above-described components may be different from the components corresponding to the left eye and the components corresponding to the right eye.

In the following drawings, for convenience of explanation, the electronic device 300 is illustrated as an electronic device in the form of glasses, but the technical idea disclosed herein may be applied to an electronic device including a head mounted display (HMD) including a display and having various types that can be mounted on a user's head part.

The frame 310 may support the window member 330. The frame 310 may be formed of a synthetic resin material. The window member 330 is fitted into an opening formed through the frame 310 so that the frame 310 can support the window member 330.

The support member 320 may be rotatably connected to the frame 310. The support member 320 may include a first support member 320-1 and a second support member 320-2. The first support member 320-1 may be connected to the frame 310 at the left side (e.g., −X direction in FIG. 3A) with respect to the frame 310, and the second support member 320-2 may be connected to the frame 310 at the right side (e.g., +X direction in FIG. 3A) with respect to the frame 310. In one embodiment, the support member 320 may be fixedly installed on the frame. For example, the first support member 320-1 connected to the left side of the frame 310 and the second support member 320-2 connected to the right side of the frame 310 may be connected to each other. The support member connected to the opposite sides of the frame 310 may form a ring shape and may be worn by being fitted around the user's head. In addition, the support member 320 may be deformed into various shapes in which the electronic device 300 can be worn on the user's face.

According to the embodiment shown in FIG. 3A, the support member 320 may be formed to be hung over the user's ear. The electronic device 300 may be worn on the user's face by hanging the support member 320 connected to the frame 310 over the user's ear. The support member 320 may rotate with respect to the frame 310. The support member 320 may be rotated in a direction in which the same approaches the frame 310, to reduce the volume of the electronic device 300.

The window member 330 may include a first window member 330-1 corresponding to the user's left eye, and a second window member 330-2 corresponding to the user's right eye. The window member 330 may be supported by the frame 310. For example, the window member 330 may be fitted into the opening formed through the frame 310. An AR image emitted from the display module may be projected onto the window member 330. A waveguide (e.g., the first waveguide and/or the second waveguide) may be formed in at least a partial region of the window member 330. The waveguide may guide the AR image emitted from the display module to the user's eye. For a detailed description of the waveguide, reference is made to the description related to the first glass 220 and the second glass 230 in FIG. 2.

The display module may output the AR image generated by the processor. When the display module generates an AR image and projects the same onto the window member 330, AR may be implemented by combining the visible light (L) incident from the front (e.g., −Y direction in FIG. 3B) through the window member 330 with an object included in the AR image. The display module may be a very small a projector (e.g., micro projector, Pico projector). For example, the display module may be a laser scanning display (LSD), a digital micro-mirror display (DMD), and a liquid crystal on silicon (LCoS). In addition, the display module may be a transparent display. In this case, the light emitting element included in the display module may be directly disposed in the window member 330. In addition, the display module may be various display devices for implementing AR.

The camera 340 may include a first camera 340-1 corresponding to the user's left eye, and a second camera 340-2 corresponding to the user's right eye. The camera 340 may be a camera 340 for capturing the user's eyes. The camera 340 may be, for example, the eye tracking camera 212-1 or 212-2 in FIG. 2. The camera 340 may capture the user's eye in real time and thus be used to identify the movement of the user's eye.

Referring to FIG. 3A, when the frame 310 is divided into a first region 310A and a second region 310B, the camera 340 may be disposed in the second region 310B of the frame 310. The second region 310B of the frame 310 may be a region adjacent to the user's nose while the electronic device 300 is worn by the user. For example, as shown in FIG. 3A, a region extending in a first direction (e.g., −Z direction in FIG. 3A), based on an imaginary line (L) crossing the frame 310, may be understood as the second region 310B. Alternatively, the second region 310B may be understood as a region located under a user's gaze when the user looks straight ahead. The camera 340 disposed in the second region 310B of the frame 310 may capture the user's eye from the underside of the user's eye. The first region 310A of the frame 310 may refer to the remaining region of the frame 310 excluding the second region 310B. For example, as shown in FIG. 3A, a region extending in the second direction (e.g., +Z direction in FIG. 3A), based on an imaginary line (L) crossing the frame 310 may be understood as the first region 310A.

The camera 340 may be inserted into the camera hole 351 formed through a support 350 disposed in the second region 310B of the frame 310. The pair of supports 350 may be formed to be in contact with the user's nose while the electronic device 300 is worn by the user. The pair of supports 350 may include a first support 350-1 located on the left side (e.g., −X direction in FIG. 3A) with respect to the center of the frame 310, and a second support 350-2 located on the right side (e.g., +X direction in FIG. 3A) with respect to the center of the frame 310. The supports 350 may allow the frame 310 to be supported by the user's nose. According to an embodiment of the disclosure, the supports 350 may be integrally formed with the frame 310 as shown in FIG. 3A. According to another embodiment, the supports 350 may be formed separately from the frame 310 and be coupled to the frame 310.

The camera hole 351 may be a hole formed through each of the supports 350. The camera hole 351 may include a first camera hole 351-1 formed through the first support 350-1, and a second camera hole 351-2 formed through the second support 350-2. The camera hole 351 may be formed to be inclined at a predetermined angle with respect to the frame 310 such that the camera 340 disposed in the second region 310B of the frame 310 can face the user's eye. When the camera 340 is inserted into the camera hole 351 formed to be inclined with respect to the frame 310, the camera 340 can face the user's eye.

The camera 340 may be inserted into the camera hole 351 formed through the support 350 from the front (e.g., −Y direction in FIG. 3B) of the electronic device. A first camera 340-1 may be inserted into the first camera hole 351-1, and a second camera 340-2 may be inserted into the second camera hole 351-2. The first camera hole 351-1 may be formed through the first support 350-1 or a portion of the frame 310 adjacent to the first support 350-1. The second camera hole 351-2 may be formed through the second support 350-2 or a portion of the frame 310 adjacent to the second support 350-2.

The electronic device 300 may include a component for fixing the camera 340 so that the camera 340 is prevented from moving in the camera hole 351. According to the embodiment shown in FIG. 3B, the camera cover and the buffer member may be inserted into the camera hole 351 together with the camera 340. The camera cover 352 may include a first camera cover 352-1 inserted into the first camera hole 351-1, and a second camera cover 352-2 inserted into the second camera hole 351-2. The buffer member may include a first buffer member 353-1 inserted into the first camera hole 351-1, and a second buffer member 353-2 inserted into the second camera hole 351-2.

Referring to FIG. 3B, the camera cover 352, the camera 340, and the buffer member may be inserted into the camera hole 351 in that order. According to another embodiment of the disclosure, the camera cover, the buffer member, and the camera 340 may be inserted into the camera hole 351 in that order, and a plurality of buffer members may be used such that the camera cover, the buffer member, the camera 340, and the buffer member are inserted into the camera hole 351 in that order.

The camera covers 352-1 and 352-2 may have a shape naturally connected to the external shape of the support 350 or the external shape of the frame 310 while being inserted into the camera hole 351. The camera covers 352-1 and 352-2 may have at least a portion (particularly, a portion viewed from the outside while being inserted into the camera hole 351) formed of the same material as the support 350 and/or the frame 310. For this reason, when the camera covers 352-1 and 352-2 are inserted into the camera hole 351, no difference may be felt between a portion through which the camera hole 351 is formed and the remaining portions.

The buffer member may be formed of an elastically deformable material. When a pressure is applied to the camera cover 352 and the camera 340 while the camera cover is inserted into the camera hole 351, the buffer member may be partially deformed and support the camera 340 disposed in the camera hole 351.

In the case of the camera 340 described below, a separate housing for protecting the main components of the camera 340 (e.g., image sensor (e.g., the image sensor 342 in FIG. 6A) and a substrate (e.g., the substrate 341 in FIG. 6A)) may not be provided to implement the small camera 340. When the camera 340 is inserted into the camera hole 351, the camera hole 351 may serve as a housing for protecting the main components of the camera 340. For example, the camera hole 351 in which the camera 340 is located corresponds to the shape of the camera 340 and, the camera hole 351 may become narrower when viewed from the front (e.g., −Y direction in FIG. 3B) of the electronic device.

Figure 4A:
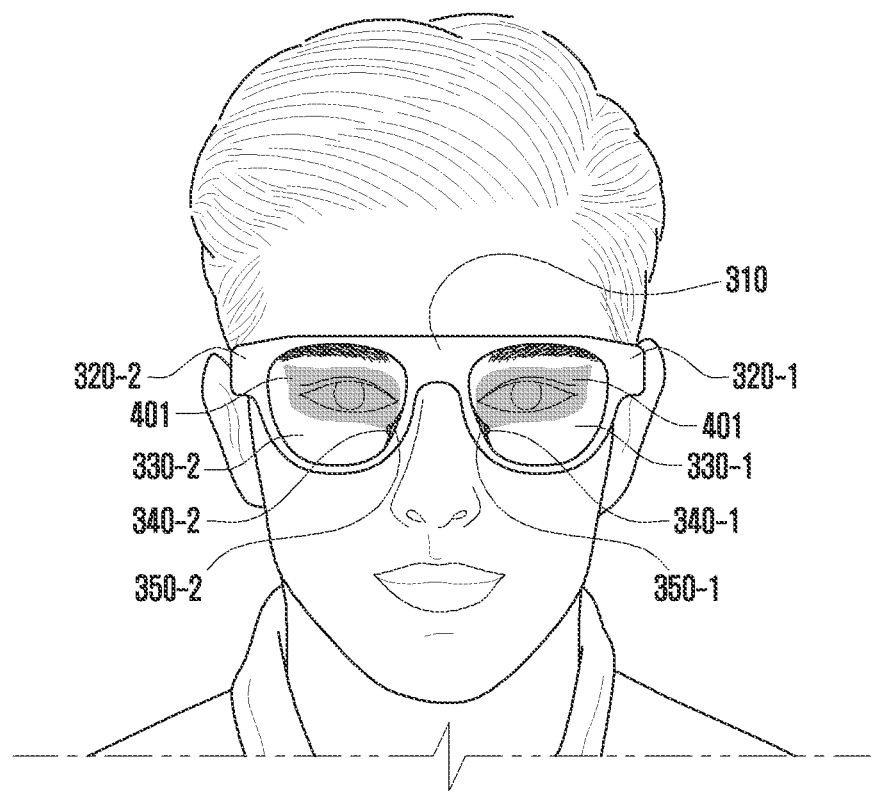
FIG. 4A illustrates a captured region by a camera according to an embodiment of the disclosure.
Figure 4B:
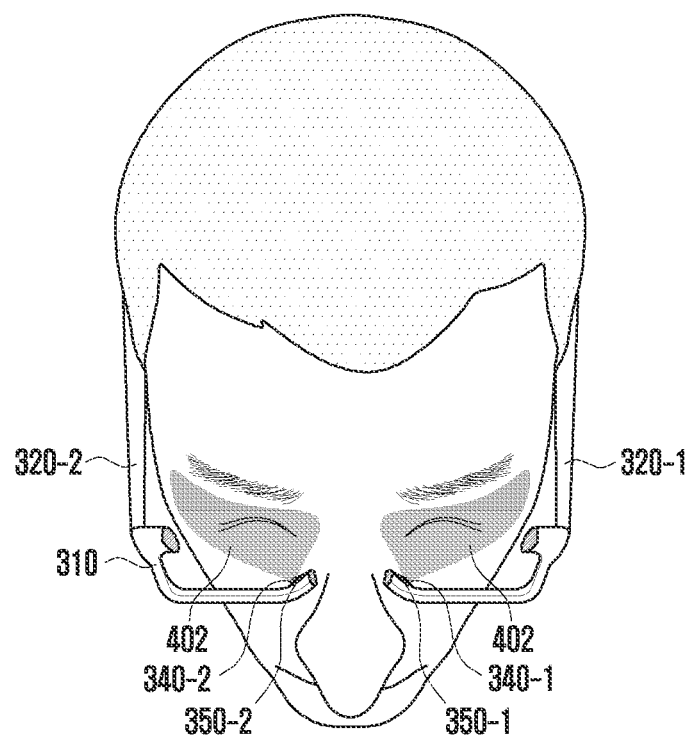
FIG. 4B illustrates a captured space according to an embodiment of the disclosure.
Figure 5:
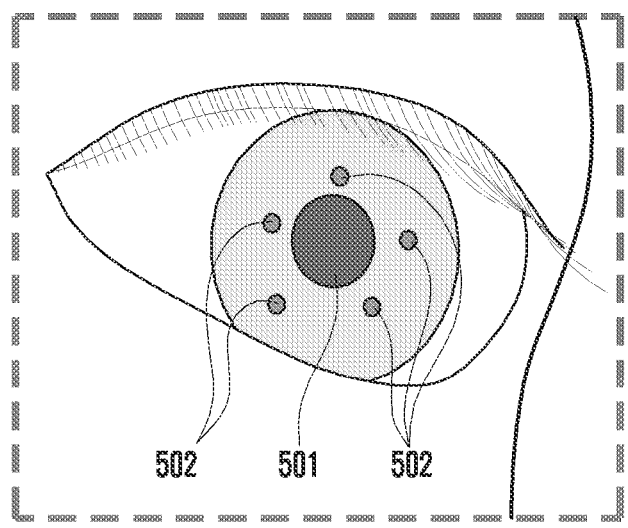
FIG. 5 is an image captured by a camera according to an embodiment of the disclosure.

FIG. 4A illustrates a captured region by a camera according to an embodiment of the disclosure. FIG. 4B illustrates a captured space according to an embodiment of the disclosure. FIG. 5 is an image captured by a camera according to an embodiment of the disclosure.

Referring to FIGS. 4A, 4B, and 5, the camera 340 may capture the user's eye. Referring to FIG. 4A, the user's eye may be included in a captured region 401 by the camera 340. The captured region 401 by the camera 340 may be determined by factors, such as a focal length of the camera 340, an angle of view, and/or a distance between the eye and the camera 340. In the camera 340, a focal length, an angle of view, and a distance to the eye may be adjusted such that the captured region 401 including the user's eye is formed.

The camera 340 may be disposed in a second region (e.g., the second region 310B in FIG. 3A) of the frame 310. The second region of the frame 310 may be a portion adjacent to the user's nose. The camera 340 disposed in the second region may capture the user's eye from the underside of the eye. When the camera 340 is disposed in the second region 310B of the frame 310, no object (e.g., the user's eyebrows or eyelashes) that may cause interfere exists in the captured space 402 (region between the captured region 401 and the camera 340) of the camera 340, and thus the user's eye can be effectively captured. In addition, when the camera 340 is disposed in the second region of the frame 310, a phenomenon in which the camera 340 is included in the user's field of view can be reduced.

The image information obtained through the camera 340 may be used to track the movement of the user's pupil 501. For example, referring to FIG. 5, an illumination point 502 projected onto the user's eye may be used. According to one embodiment, the illumination point 502 projected onto the user's eye may be an infrared wavelength IR LED emitted by the illumination part (e.g., the illumination LED 242 in FIG. 2) toward the user's eye. The movement of the user's pupil 501 may be tracked through the relative distance between the pupil 501 and the illumination point 502 projected onto the user's eye from the illumination part. The illumination point 502 may refer to a point at which the strongest light intensity point in the illumination part is projected onto the user's eye. The movement of the pupil 501 may be tracked using a change in the relative distances between the pupil 501 and the plurality of illumination points 502.

The plurality of illumination parts (e.g., the illumination LED 242 FIG. 2) may be arranged at a predetermined interval along the inner periphery of the frame 310. The number and arrangement of the illumination parts may be variously changed according to the distance between the camera 340 and the user's eye and the positional relationship between the illumination part and the camera 340. For example, the plurality of illumination parts (e.g., the illumination LED 242 in FIG. 2) may be arranged in consideration of the incident position and angle at which light emitted from the illumination part is reflected from the user's eye, and the reflected light is incident to the camera 340. According to an embodiment of the disclosure, only specific illumination parts of the plurality of illumination parts may be activated according to surrounding situations (e.g., ambient light or wearing state of the electronic device). The number of illumination points 502 required for tracking the pupil may be different according to surrounding situations. For example, in a situation in which ambient light is introduced weakly, the required number of illumination points 502 may be reduced compared to a situation in which ambient light is strongly introduced. In this case, power consumption due to driving of the illumination parts can be reduced by activating only specific illumination parts. The processor may perform control such that the plurality of illumination parts are activated based on a specified pattern or a specified order.

The processor (e.g., the processor 120 in FIG. 1) may acquire a user's gaze direction by tracking the movement of the user's pupil 501. The processor may control the display module (e.g., the display module 160 in FIG. 1) by using the gaze direction.

For example, the processor may control the display module such that the user's gaze direction matches the center of the image projected onto the window member (e.g., the window member 330 in FIG. 3A). The processor may control the display module such that the resolution of the AR image corresponding to a predetermined region about the user's gaze direction is adjusted to be higher than those of the remaining regions. The processor may set a predetermined region as a region of interest, based on the user's gaze direction and may generate an AR image in which an AR object is located in the region. In addition, the processor may use image information acquired through the camera to variously control the display module or to generate an AR image.

The processor (e.g., the processor 120 in FIG. 1) may identify an input based on a user's gaze by tracking the movement of the user's pupil 501. For example, when a virtual object is displayed through the display module (e.g., the display module 160 in FIG. 1) and a user's gaze is directed toward the virtual object for a specified time or longer, the processor may determine that the user is interested in the virtual object and may provide additional information on the virtual object.

Figure 6A:
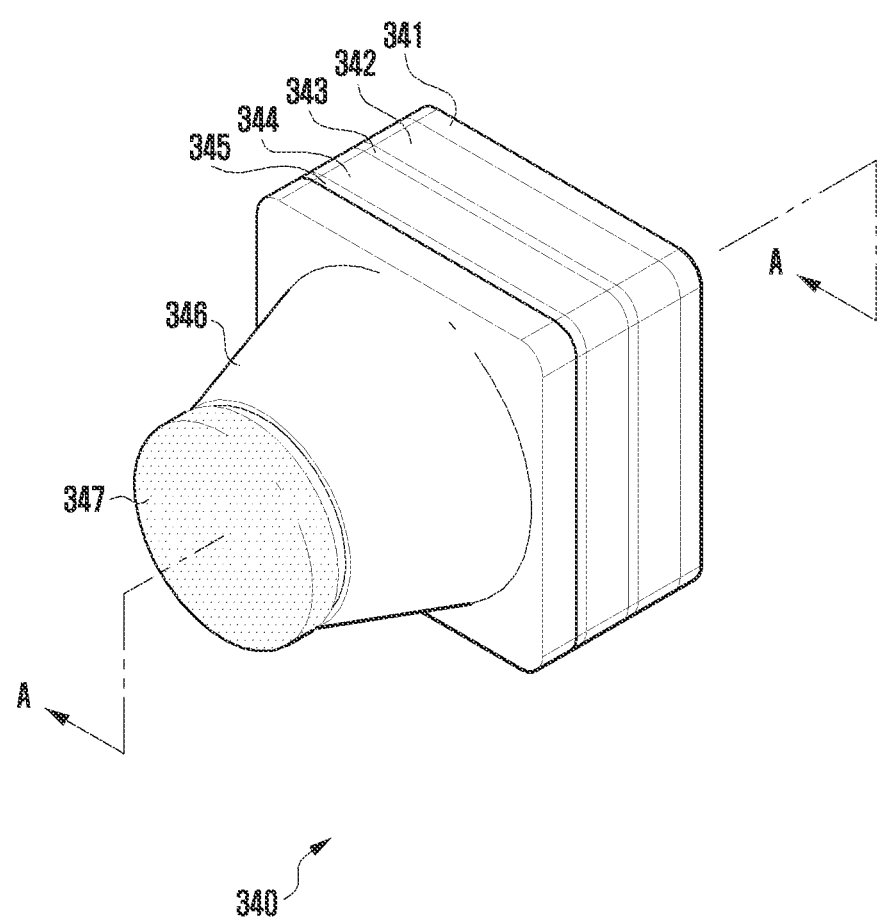
FIG. 6A is a perspective view of a camera according to an embodiment of the disclosure.
Figure 6B:
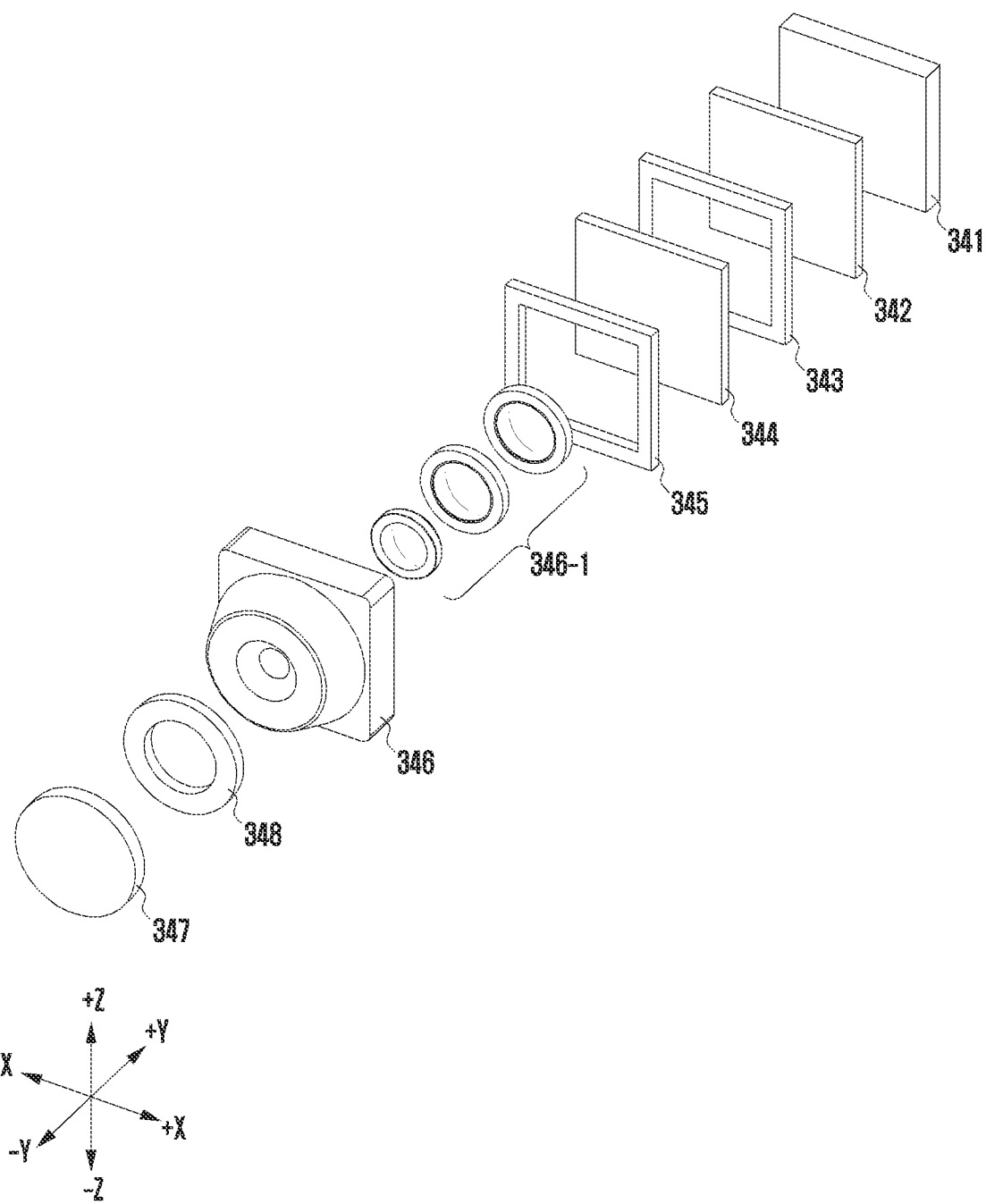
FIG. 6B is an exploded perspective view of the camera shown in FIG. 6A according to an embodiment of the disclosure.
Figure 6C:
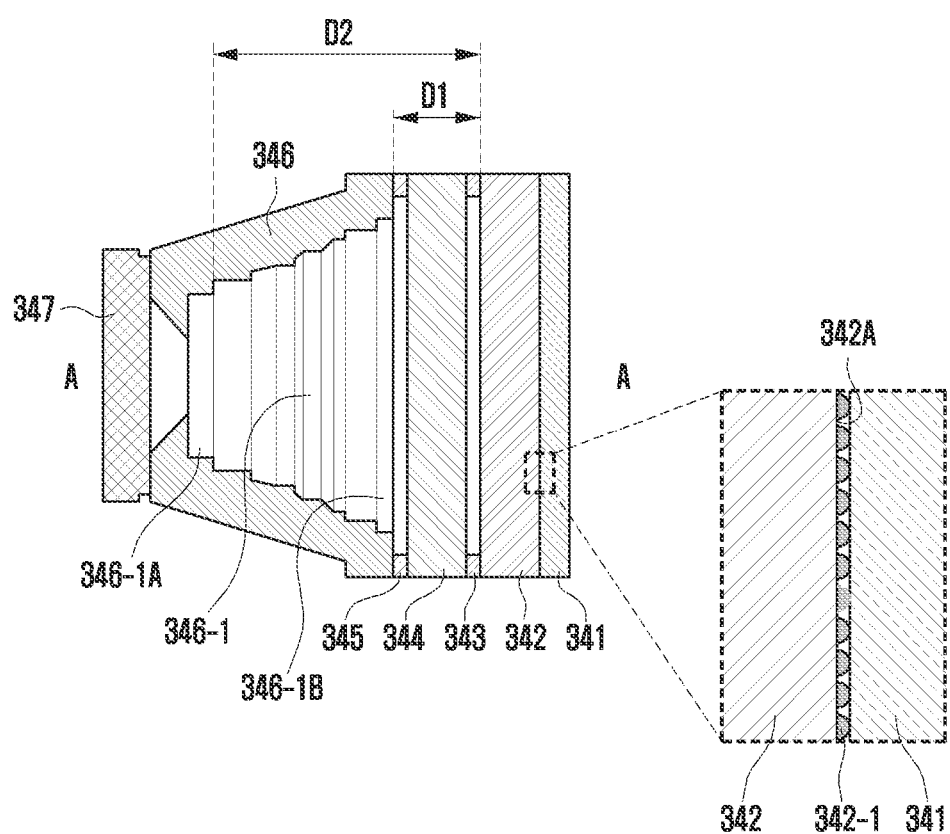
FIG. 6C is a cross-sectional view of the camera shown in FIG. 6A, taken along line A-A according to an embodiment of the disclosure.

FIG. 6A is a perspective view of a camera according to an embodiment of the disclosure. FIG. 6B is an exploded perspective view of the camera shown in FIG. 6A according to an embodiment of the disclosure. FIG. 6C is a cross-sectional view of the camera shown in FIG. 6A, taken along line A-A according to an embodiment of the disclosure.

Referring to FIGS. 6A and 6B, the camera 340 may include a substrate 341, an image sensor 342, a first adhesive layer 343, protection glass 344, and a second adhesive layer 345, a lens barrel 346 including a plurality of lenses 346-1, and a cover glass 347. The above-mentioned components of the camera 340 is merely an example, and the components included in the camera 340 disclosed herein are not limited to the above components.

The substrate 341 may be, for example, a printed circuit board (PCB). The substrate 341 may be electrically connected to a substrate on which a processor is disposed, so as to transmit image information generated by the image sensor 342 of the camera 340 to the processor (e.g., the processor 120 in FIG. 1) of the electronic device (e.g., the electronic device 101 in FIG. 1). For example, the substrate 341 of the camera 340 may be electrically connected to a substrate on which a processor is disposed, through a flexible printed circuit board (FPCB). The processor may be disposed on a printed circuit board (e.g., the first printed circuit board 231-1 and the second printed circuit board 232-2 in FIG. 2) embedded in a support member (e.g., the first support part 221 and second support part 222 in FIG. 2). A first connection member (e.g., flexible printed circuit board) (not shown) disposed inside the frame 310 and extending up to the camera hole 351 into which the camera 340 is inserted may be connected to a second connection member (e.g., flexible printed circuit board) (not shown) connected to the printed circuit board embedded in the support member 320. The camera 340 inserted into the camera hole 351 may be electrically connected to the first connection member, and the first connection member may be connected to the second connection member, whereby the camera 340 may be electrically connected to the printed circuit board on which the processor is disposed. In one embodiment, a solder ball may be disposed on the rear surface of the substrate 341 of the camera 340, and the solder ball may be in contact with the first connection member, whereby the substrate 341 and the first connection member may be electrically connected to each other. The printed circuit board on which the processor is disposed and the camera 340 may be electrically connected to each other through a transparent electrode positioned on glass (e.g., the first glass 220 or the second glass 230 in FIG. 2).

The image sensor 342 may include a photoelectric element configured to convert light into an electrical signal. For example, the photoelectric element included in the image sensor 342 may be a charged coupled device (CCD) or a complementary metal-oxide semiconductor (CMOS). The image sensor 342 may be disposed on the substrate 341 to be electrically connected to the substrate 341. Referring to FIG. 6C, a solder ball 342-1 may be formed on the surface of the image sensor 342 facing the substrate 341. The image sensor 342 and the substrate 341 may be coupled to each other by solder bonding through the solder ball 342-1 formed on the image sensor 342, whereby the image sensor 342 and the substrate 341 may be electrically connected to each other. As described above, the volume of the camera 340 may be reduced by coupling the image sensor 342 and the substrate 341 to each other by the solder bonding through the solder ball 342-1, compared to coupling the same through wire bonding of the related art. In the case of wire bonding, a space 342A for wire bonding is required on the outer periphery of the image sensor 342. Accordingly, the overall volume of the camera 340 may increase due to the area of the substrate 341 which needs to be larger than the area of the image sensor 342. As for the camera 340 disclosed herein, the substrate 341 and the image sensor 342 may have substantially the same area because the image sensor 342 and the substrate 341 are coupled through the solder ball 342-1. In one embodiment, the area of the substrate 341 may be less than or equal to than the area of the image sensor 342. Since the area of the substrate 341 can be reduced compared to that of a substrate of the related art, the overall volume of the camera 340 can also be reduced. Since the camera 340 disclosed herein may be inserted into the camera hole 351 and may be protected by the frame 310 or the support 350 of the electronic device 300, a separate housing for protecting the camera 340 may not be required. Accordingly, an additional space for disposing the housing around the substrate 341 may not be required.

The protection glass 344 may be disposed on the image sensor 342. The protection glass 344 may be disposed on the image sensor 342 to protect the image sensor 342. The image sensor 342 and the protection glass 344 may be coupled to each other by the first adhesive layer 343 disposed along the edge of the image sensor 342. In the case of the image sensor 342 employing wire bonding of the related art, the edge portion of the image sensor 342 is used as a portion to which a wire is coupled. Since the image sensor 342 disclosed herein is coupled to the substrate 341 through the solder ball 342-1, the first adhesive layer 343 may be disposed around the edge of the image sensor 342. As described above, the image sensor 342 and the protection glass 344 are coupled through the first adhesive layer 343 disposed around the image sensor 342, thereby reducing the overall volume of the camera 340.

The lens barrel 346 including the plurality of lenses 346-1 may be disposed on the protection glass 344. The protection glass 344 and the lens barrel 346 may be coupled to each other by the second adhesive layer 345 disposed along the edge of the protection glass 344. In this case, the protection glass 344 and the lens barrel 346 may be spaced apart from each other by a predetermined interval. The interval may be utilized to compensate for the difference between the cameras 340 in the manufacturing process of the camera 340 so that the camera 340 can generate image information having a specified quality at the time of assembling the camera 340. Such a difference may be caused by various factors (e.g., assembly allowance, specification error of the image sensor 342, etc.). For example, the difference may occur due to minute changes in optical design factors such as thickness, interval, and eccentricity of the lenses 346-1 disposed in the lens barrel 346. The difference needs to be compensated to allow the camera 340 disclosed herein, which is disposed in the electronic device, to capture the user's eyes with a specified quality. The difference between the cameras 340 may be compensated during the process of assembling the camera 340 by forming an interval between the protection glass 344 and the lens barrel 346 and applying different interval for each camera 340 at the time of assembling the camera 340.

The second adhesive layer 345 disposed between the protection glass 344 and the lens barrel 346 may be formed of an optical or thermosetting material. The second adhesive layer 345 may have a certain level of fluidity before being cured. A position of the lens barrel 346 with respect to the protection glass 344 may be adjusted (e.g., adjusted by X-axis, Y-axis, or Z-axis rotation in FIG. 6B) to compensate for the error of the camera 340. When the position of the lens barrel 346 with respect to the protection glass 344 is aligned, the second adhesive layer 345 may be cured using light or heat. Also, the interval between the protection glass 344 and the lens barrel 346 may be used for optical axis alignment. In order to match the optical axes of the image sensor 342 and the plurality of lenses 346-1 included in the lens barrel 346, the lens barrel 346 may be disposed at a predetermined angle with respect to the protection glass 344.

The distance between the lens barrel 346 and the image sensor 342 may be adjusted such that an optical total track length (OTTL)/back focal length (BFL) is about 0.3 to about 0.5. The OTTL may refer to distance D2 from the focal point to the lens 346-1A that is farthest from the image sensor 342 among the lenses 346-1 included in the lens barrel 346. The BFL may refer to distance D1 from the focal point to the lens 346-1B that is closest to the focal point, among the lenses 346-1 included in the lens barrel 346. The minimum focal length of the camera 340 may be equal to or smaller than the distance between the user's eye and the camera 340 disposed in the electronic device by adjusting the OTTL/BFL as described above. The distance between the lens barrel 346 and the protection glass 344 may be adjusted such that the assembled camera 340 has an OTTL/BFL of about 0.3 to about 0.5.

According to the embodiment shown in FIG. 6A, the lens barrel 346 may be formed in a shape that decreases in diameter as the lens barrel is farther away from the image sensor 342. The plurality of lenses embedded in the lens barrel 346 may be configured such that a lens thereof (e.g., the lens 346-1A) that is far from the image sensor 342 has a diameter smaller than that of a lens thereof (e.g., the lens 346-1B) that is close to the image sensor 342. The inside of the camera hole (e.g., the camera holes 351-1 or 351-2 in FIG. 3B) into which the camera 340 is inserted may formed in a shape corresponding to the barrel 346 such that the camera 340 can be stably seated in the camera hole. For example, when the lens barrel 346 is formed to have a reduced diameter as shown in FIG. 6A, the inner diameter of the camera hole facing the lens barrel 346 may also be formed to decrease in the direction in which the camera enters.

The cover glass 347 may be coupled to the lens barrel 346. The cover glass 347 may be attached to the outer surface of the lens barrel 346 by an adhesive method. For example, the cover glass 347 may be attached to the lens barrel 346 through a third adhesive layer 348. In one embodiment, a hole (not shown) through which the cover glass 347 can be inserted may be formed in the lens barrel 346. The cover glass 347 may protect the plurality of lenses 346-1 included in the lens barrel 346. As described above, the overall volume of the camera 340 may be reduced by coupling the cover glass 347 directly to the lens barrel 346 other than a separate housing. In addition, since the cover glass 347 protects the camera 340, a separate component for protecting the camera 340 may not be required in the camera hole 351 into which the camera 340 is inserted.

According to an embodiment of the disclosure, the first adhesive layer 343 between the image sensor 342 and the protection glass 344 and/or the second adhesive layer 345 between the protection glass 344 and the lens barrel 346 may be omitted. For example, when the error in the camera 340 is small, the first adhesive layer 343 and/or the second adhesive layer 345 may be omitted and the coupling may be achieved by an adhesive.

The overall volume of the camera 340 included in the electronic device disclosed herein may be reduced compared to a camera of the related art. Accordingly, the weight of the electronic device can be reduced, and the phenomenon in which the camera 340 is included in the user's field of view can be reduced, thereby increasing the usability of the electronic device.

An electronic device (e.g., the electronic device 101 in FIG. 1 and the electronic device 200 in FIG. 2) according to various embodiments disclosed herein may include a frame (e.g., the frame 310 in FIG. 3A) including a first region (e.g., the first region 310A in FIG. 3A) and a second region (e.g., the second region 310B in FIG. 3A), a window member (e.g., the window member 330 in FIG. 3A) supported by the frame, a support member (e.g., the support member 320 in FIG. 3A) rotatably connected to the frame, a display module (e.g., the display module 160 in FIG. 1 and the display module 214 in FIG. 2) configured to project an image onto the window member, and a camera (e.g., the camera 340 in FIG. 3A) disposed in the second region of the frame to capture the eye part of a user. The camera may include a substrate (e.g., the substrate 341 in FIG. 6B), and an image sensor (e.g., the image sensor 342 in FIG. 6B) disposed on the substrate, and an area of the substrate may be equal to or smaller than an area of the image sensor.

When the frame is divided into two regions, the second region of the frame may be a region adjacent to the user's nose while the electronic device is worn by the user.

The camera may be disposed on a support (e.g., the support 350 in FIG. 3A) formed in the second region of the frame such that the camera is in contact with the user's nose and the frame is supported by the user's nose while the electronic device is worn by the user.

The camera may be inserted into a camera hole (e.g., the camera hole 351 in FIG. 3B) formed through the support.

The camera hole may be formed to be inclined at a predetermined angle with respect to the frame such that the camera inserted into the camera hole can face the eye part of a user.

The electronic device may further include a plurality of illumination parts (e.g., the illumination LED 242-1 or 242-2 in FIG. 2) arranged on the frame to be spaced apart from each other at a predetermined interval such that the user's eye is irradiated with infrared light.

The camera may further include a protection glass (e.g., the protection glass 344 in FIG. 6B) disposed on the image sensor, a lens barrel (e.g., the lens barrel 346 in FIG. 6B) disposed on the protection glass and having a plurality of lenses (e.g., the plurality of lenses 346-1 in FIG. 6B) embedded therein, and a cover glass (e.g., the cover glass 347 in FIG. 6B) coupled to the lens barrel to protect the plurality of lenses included in the lens barrel.

The image sensor and the protection glass of the camera may be coupled to each other by a first adhesive layer (e.g., the first adhesive layer 343 in FIG. 6B) disposed along the edge of the image sensor.

The image sensor of the camera may be electrically connected to the substrate by a solder ball formed on a surface of the image sensor facing the substrate.

The lens barrel of the camera may be formed to have a diameter inversely proportional to a distance from the image sensor.

The camera may be inserted into the camera hole formed in the second region of the frame, and the camera hole may be formed to have an inner diameter decreasing in a direction in which the camera enters, to correspond to the lens barrel of the camera.

The protection glass and the lens barrel of the camera may be mutually coupled to be spaced apart from each other at a predetermined interval by a second adhesive layer (e.g., the second adhesive layer 345 in FIG. 6B) disposed along the edge of the protection glass.

The camera may be configured such that a ratio of a back focal length (BFL) from the image sensor to a lens, which is closest to the image sensor among the plurality of lenses 346-1 included in the lens barrel, to an optical total track length (OTTL) from the image sensor to a lens, which is farthest from the image sensor among the plurality of lenses included in the lens barrel, is 0.3 to 0.5.

A camera (e.g., the camera 340 in FIG. 3A) included in a head mounted electronic device according to various embodiments disclosed herein may include a substrate (e.g., the substrate 341 in FIG. 6B), an image sensor (e.g., the image sensor 342 in FIG. 6B) disposed on the substrate and electrically connected to the substrate, a protection glass (e.g., the protection glass 344 in FIG. 6B) disposed on the image sensor, a lens barrel (e.g., the lens barrel 346 in FIG. 6B) disposed on the protection glass and having a plurality of lenses (e.g., the plurality of lenses 346-1 in FIG. 6B) embedded therein, and a cover glass (e.g., the cover glass 347 in FIG. 6B) coupled to the lens barrel to protect the plurality of lenses included in the lens barrel. An area of the substrate may be smaller than or equal to an area of the image sensor.

The image sensor and the protection glass may be coupled to each other by a first adhesive layer (e.g., the first adhesive layer 343 in FIG. 6B) disposed along the edge of the image sensor.

The image sensor may be electrically connected to the substrate by a solder ball formed on a surface of the image sensor facing the substrate.

The lens barrel may be formed to have a diameter inversely proportional to a distance from the image sensor.

The plurality of lenses embedded in the lens barrel may be configured such that the lenses have a diameter decreasing as the lenses are farther away from the image sensor 342.

The protection glass and the lens barrel of the camera may be mutually coupled to be spaced apart from each other at a predetermined interval by a second adhesive layer (e.g., the second adhesive layer 345 in FIG. 6B) disposed along the edge of the protection glass.

A ratio of a back focal length (BFL) from the image sensor to a lens, which is closest to the image sensor among the plurality of lenses included in the lens barrel, to an optical total track length (OTTL) from the image sensor to a lens, which is farthest from the image sensor among the plurality of lenses included in the lens barrel, may be 0.3 to 0.5.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
 a frame comprising a first region and a second region;
 a window member supported by the frame;
 a waveguide formed in at least a partial region of the window member;
 a support member connected to the frame;
 a display configured to project an image onto the window member through the waveguide, the image includes at least one augmented reality image; and
 a camera disposed in the second region of the frame to capture a portion of a user's eye,
 wherein the camera comprises:
  a substrate and an image sensor disposed on the substrate,
  a protection glass disposed on the image sensor, and
  a lens barrel disposed on the protection glass and having a plurality of lenses embedded therein, the plurality of lenses including a nearest lens that is closest to the image sensor and a furthest lens that is furthest from the image sensor,
 wherein an area of the substrate is equal to or smaller than an area of the image sensor,
 wherein the camera is inserted into a camera hole formed through a support disposed in the second region of the frame,
 wherein the support is formed to be in contact with the user's nose while the electronic device is worn by the user, and
 wherein the camera is configured such that a ratio of a back focal length (BFL) to an optical total track length (OTTL) is 0.3 to 0.5,
 wherein the BFL is a distance from a focal point to a surface of the nearest lens closest to the image sensor, and
 wherein the OTTL is a distance from the focal point to a surface of the furthest lens that is closest to the image sensor.

2. The electronic device of claim 1, wherein, when the frame is divided into two regions, the second region of the frame is a region adjacent to the user's nose while the electronic device is worn by the user.

3. The electronic device of claim 1, wherein the camera hole is formed to be inclined at a predetermined angle with respect to the frame such that the camera inserted into the camera hole faces the user's eye.

4. The electronic device of claim 1, further comprising a plurality of illumination parts arranged on the frame to be spaced apart from each other at a predetermined interval such that the user's eye is irradiated with infrared light.

5. The electronic device of claim 1, wherein the camera further comprises:
 a cover glass coupled to the lens barrel to protect the plurality of lenses included in the lens barrel.

6. The electronic device of claim 5, wherein the image sensor and the protection glass of the camera are coupled to each other by a first adhesive layer disposed along an edge of the image sensor.

7. The electronic device of claim 5, wherein the image sensor of the camera is electrically connected to the substrate by a solder ball formed on a surface of the image sensor facing the substrate.

8. The electronic device of claim 5, wherein the lens barrel of the camera is formed to have a diameter inversely proportional to a distance from the image sensor.

9. The electronic device of claim 8,
 wherein the camera is inserted into a camera hole formed in the second region of the frame, and
 wherein the camera hole is formed to have an inner diameter decreasing in a direction in which the camera enters, so as to correspond to the lens barrel of the camera.

10. The electronic device of claim 5, wherein the protection glass and the lens barrel of the camera are mutually coupled to be spaced apart from each other at a predetermined interval by a second adhesive layer disposed along an edge of the protection glass.

* * * * *